United States Patent
Han et al.

(10) Patent No.: US 10,763,518 B2
(45) Date of Patent: Sep. 1, 2020

(54) PLATE MEMBER FOR A CELL STACK

(71) Applicant: TEMASEK POLYTECHNIC, Singapore (SG)

(72) Inventors: Ming Han, Singapore (SG); Yunzhong Chen, Singapore (SG); Lei Wang, Singapore (SG); Chun Yu Ling, Singapore (SG)

(73) Assignee: TEMASEK POLYTECHNIC, Singapore (SG)

( * ) Notice: Subject to any disclaimer, the term of this patent is extended or adjusted under 35 U.S.C. 154(b) by 89 days.

(21) Appl. No.: 15/571,845

(22) PCT Filed: Apr. 29, 2016

(86) PCT No.: PCT/SG2016/050201
§ 371 (c)(1),
(2) Date: Nov. 5, 2017

(87) PCT Pub. No.: WO2016/178628
PCT Pub. Date: Nov. 10, 2016

(65) Prior Publication Data
US 2018/0145343 A1    May 24, 2018

(30) Foreign Application Priority Data
May 4, 2015 (SG) .......................... 10201503476Q

(51) Int. Cl.
*H01M 8/0254* (2016.01)
*H01M 8/0258* (2016.01)
(Continued)

(52) U.S. Cl.
CPC ....... *H01M 8/0254* (2013.01); *H01M 8/0258* (2013.01); *H01M 8/248* (2013.01);
(Continued)

(58) Field of Classification Search
CPC ....... H01M 2008/1095; H01M 8/0254; H01M 8/0258; H01M 8/2465; H01M 8/248; H01M 8/2483
See application file for complete search history.

(56) References Cited

U.S. PATENT DOCUMENTS 5,750,281 A    5/1998  Washington et al.
6,322,919 B1 *  11/2001  Yang .................. H01M 8/0228
                                                           429/457
(Continued)

FOREIGN PATENT DOCUMENTS

EP        2759011 B1    7/2014
JP       61128469 A    6/1986

*Primary Examiner* — Victoria H Lynch
(74) *Attorney, Agent, or Firm* — Horizon IP Pte Ltd

(57) ABSTRACT

A plate member for a cell stack, a cell stack assembly, a method of forming a plate member for a cell stack and a method of assembling a cell stack may be provided, and the plate member comprises a channel sheet comprising at least one peak and one trough for forming fluid flow channels; two alignment parts, each alignment part comprising a main body and one or more alignment members, the main body having a through hole provided within the main body; and wherein the alignment part is capable of aligning the channel sheet parallel to a plane of the main body and the alignment member is capable of aligning the alignment member to another corresponding alignment member along an axis passing through the alignment member; and further wherein the channel sheet is disposed between the two alignment parts.

18 Claims, 13 Drawing Sheets

(51) Int. Cl.
*H01M 8/248* (2016.01)
*H01M 8/2483* (2016.01)
*H01M 8/2465* (2016.01)
*H01M 8/1018* (2016.01)

(52) U.S. Cl.
CPC ....... *H01M 8/2465* (2013.01); *H01M 8/2483* (2016.02); *H01M 2008/1095* (2013.01)

(56) References Cited

U.S. PATENT DOCUMENTS

| | | |
|---|---|---|
| 7,678,488 B2 | 3/2010 | Franklin et al. |
| 8,470,489 B2 * | 6/2013 | Jones ............ H01M 8/0202 429/457 |
| 2004/0023090 A1 | 2/2004 | Pearson et al. |
| 2011/0293982 A1 | 12/2011 | Martz et al. |
| 2014/0220473 A1 * | 8/2014 | Cole ............ H01M 8/0254 429/482 |

* cited by examiner (9A)

(9B)

(9C)

(9D)

(9E)

(9F)

(9G)

000# PLATE MEMBER FOR A CELL STACK

TECHNICAL FIELD

The present disclosure relates broadly to a plate member for a cell stack and to a method of forming a plate member for a cell stack.

BACKGROUND

In current technology, fuel cell components are increasingly being integrated to simplify the stack assembly procedures and for cost savings. For example, a typical Membrane Electrode Assembly (MEA) with five layers are typically used. The MEA with five layers comprises one layer of Proton Exchange Membrane (PEM) sandwiched or disposed between two layers of dispersion mediums, with one layer of catalyst located each in the two interfaces between the PEM and the dispersion mediums. This arrangement integrates the membrane, the electrodes and the diffusion mediums and thus simplifies a stack assembly of the MEA.

However, there are other developments regarding one other significant component of a stack which is the bipolar plate.

In the PEM fuel cell industry, materials used have significantly improved. Conventional graphite bipolar plates are gradually replaced by metallic bipolar plates, which can be made relatively thin and thus, reducing weight and dimensions, as well as improving the power density of the stack. This is particularly advantageous for portable fuel cells and mobile usage.

The usage of metallic bipolar plates introduces a number of new challenges. As the metallic bipolar plates are typically made into corrugated form with at least one peak and one trough, a separator sheet is used to form air flow channels and to prevent hydrogen flow in the dispersion medium from contacting with air. The sealing of the hydrogen flow channels formed by apertures on the two ends of a stack is one challenge, particularly when corrugated sheets are used. The alignment of the corrugated sheet, the separator sheet and the MEA is another challenge.

The apertures of the constituent parts of a fuel cell, that is, a bipolar plate, a MEA, a corrugated sheet and a separator sheet are desired to be well sealed and aligned. When assembled, these parts form a continuous cylindrical shaped cavity within the fuel cell and function as an internal manifold. Hydrogen gas passes through this manifold and is distributed evenly to the respective cells. Excess hydrogen, when purged from the cells, exit through another manifold of similar arrangement.

It has been recognised that poor alignment of all the apertures within the fuel cell (i.e. between the bipolar plate, the MEA, the corrugated sheet and the separator sheet etc.) results in flow impediment of hydrogen gas. This lowers the performance of the stack due to reduced fuel intake. Additionally, poor alignment also causes non-uniform distribution of hydrogen gas to each of the cells in the stack and this results in lower overall performance due to a reduced stoichiometric number for cells with lower hydrogen intake.

It has been recognised that the apertures in both ends of the stack are not sufficient for proper alignment. As discussed, poor alignment compromises both the aesthetic appeal of the stack and also the power output performance.

In addition, the corrugated sheet used is typically coated with precious metals, such as gold or silver, and is therefore relatively expensive. However, the areas near the two ends of the stack are typically not used and thus constitute a waste of the corrugated sheet material.

Furthermore, it has been recognised that the assembly procedure of current stacks is complex due to the tight sealing requirements.

In one currently known example, MEAs are aligned within a stack assembly. The stack is an electrochemical device including a fuel cell, a compressor and an electrolyzer. A close cathode system is used in the stack assembly. Thus, a frame is used to position the MEA and separator plates. The MEA is enclosed completely in the body of the frame. Sealing arrangements, for example bead arrangement or elastomeric seals, are needed around the perimeter of the bipolar plate. Bridges are arranged at a periphery of an opening at two ends of the frame to abut against a positioning device. These requirements of sealing and bridges add to the complexity during manufacturing. In addition, strict tolerances also need to be followed during the manufacturing process to ensure that the MEA is enclosed in the frame. Furthermore, the stack assembly in the example is not secure as the frame of the bipolar plate merely rests against two positioning devices.

In another currently known example, a corrugated plate is attached to a base plate with adhesives. However, it has been recognised that when adhesives are used, there are several degrees of freedom during the manufacturing process. It is therefore typical that a tolerance limit for placement is exceeded during the manufacturing process and alignment defects appear.

In yet another currently known example, a repeater unit is used in a solid oxide fuel cell. A frame and a separator in the repeater unit establish a plurality of fuel flow path and duct houses. The ridged holes of the conduits and the separator are positioned to align a stack of the repeater units. The repeater units are firstly stacked without any secure point. Therefore, there is a problem that the stacked repeater units are typically not aligned properly.

In yet another currently known example, a bipolar plate is used in a molten carbonate fuel cell (MCFC). The MCFC is operated in a temperature higher than the melting point of electrolyte materials. The bipolar plate comprises a plurality of projection parts to adhere the bipolar plate to a masking plate to hold a current collector between the bipolar plate and the masking plate. A frame is used to position the MEA and separator plates. The MEA is enclosed completely in the body of the frame. Coupling arrangements, for example projections and penetration holes arrangement, are needed around the perimeter of the bipolar plate. This requirement of projections and penetration holes add to the complexity during manufacturing. In addition, strict tolerances also need to be followed during the manufacturing process to ensure that the MEA is enclosed in the frame.

Therefore, there exists a need for a plate member for a cell stack and a method of forming a plate member for a cell stack that seek to address at least one of the above problems.

SUMMARY

In accordance with an aspect, there is provided a plate member for a cell stack, the plate member comprising a channel sheet comprising at least one peak and one trough for forming fluid flow channels; two alignment parts, each alignment part comprising a main body and one or more alignment members, the main body having a through hole provided within the main body; wherein the alignment part is capable of aligning the channel sheet parallel to a plane of the main body and the alignment member is capable of aligning the alignment member to another corresponding alignment member along an axis passing through the alignment member; and further wherein the channel sheet is disposed between the two alignment parts.

The alignment part may comprise an engagement surface to engage the channel sheet for aligning the channel sheet parallel to the plane of the main body.

The alignment part may comprise two alignment members, each alignment member extending within the plane of the main body and substantially perpendicularly from a longitudinal edge of the main body, and wherein the engagement surface may be defined between the alignment members.

The alignment member may comprise an aperture for aligning the alignment member to said another corresponding alignment member along the axis passing through the alignment member.

The alignment member may be disposed at one end of the main body of the alignment part and may be in the shape of a substantially circular ring.

The alignment part may further comprise respective sealing parts provided on two opposing surfaces of the alignment part, each sealing part capable of containing a sealing component.

The plate member may further comprise a separator sheet that abuts a bottom surface of the alignment part, the separator sheet having at least one through hole for aligning to the through hole provided within the main body of the alignment part.

The channel sheet and the separator sheet may co-operate to form the said fluid flow channels.

The channel sheet may be in the form of a rectangular corrugated sheet.

The plate member may further comprise a membrane electrode assembly (MEA) that abuts a top surface of the alignment part.

In accordance with another aspect, there is provided a cell stack assembly, the assembly comprising a bottom end plate, the bottom end plate comprising a bottom end plate alignment member; one or more plate members, each plate member as mentioned in any of the preceding paragraphs; a top end plate, the top end plate comprising a top end plate alignment member; and wherein the alignment member of each of said one or more plate members is aligned to the bottom end plate alignment member and the top end plate alignment member along an axis passing through the alignment member of each of said one or more plate members.

The assembly may further comprise a rod member extended along the axis passing through the alignment member of each of said one or more plate members.

In accordance with another aspect, there is provided a method of forming a plate member for a cell stack, the method comprising providing a channel sheet comprising at least one peak and one trough for forming fluid flow channels; providing two alignment parts, each alignment part comprising a main body and one or more alignment members, the main body having a through hole provided within the main body, and the alignment member is capable of aligning the alignment member to another corresponding alignment member along an axis passing through the alignment member; disposing the channel sheet between the two alignment parts; and aligning the channel sheet parallel to a plane of the main body of each alignment part using the two alignment parts.

The step of aligning the channel sheet may further comprise engaging the channel sheet with an engagement surface of the alignment part.

The engagement surface may be defined between two alignment members of the alignment part, each alignment member extending within the plane of the main body and substantially perpendicularly from a longitudinal edge of the main body.

The alignment part may further comprise respective sealing parts provided on two opposing surfaces of the alignment part, each sealing part capable of containing a sealing component, and the method may further comprise providing a separator sheet that abuts a bottom surface of the alignment part, the separator sheet having at least one through hole for aligning to the through hole provided within the main body of the alignment part.

The method may further comprise forming the said fluid flow channels with the channel sheet and the separator sheet.

The channel sheet may be in the form of a rectangular corrugated sheet.

The method may further comprise providing a membrane electrode assembly (MEA) that abuts a top surface of the alignment part.

In accordance with yet another aspect, there is provided a method of assembling a cell stack assembly, the method comprising providing a bottom end plate, the bottom end plate comprising a bottom end plate alignment member; providing one or more plate members, each plate member as mentioned in any of the preceding paragraphs; providing a top end plate, the top end plate comprising a top end plate alignment member; and aligning the alignment member of each of said one or more plate members to the bottom end plate alignment member and the top end plate alignment member along an axis passing through the alignment member of each of said one or more plate members.

The method may further comprise inserting the alignment member of each of said one or more plate members along a rod member.

BRIEF DESCRIPTION OF THE DRAWINGS

Exemplary embodiments of the invention will be better understood and readily apparent to one of ordinary skill in the art from the following written description, by way of example only, and in conjunction with the drawings, in which.

DETAILED DESCRIPTION

Exemplary embodiments described herein are applicable to fuel cell technology and may provide a plate member for a cell stack. For example, a bipolar plate may be provided which can simplify an assembly procedure of a Proton Exchange Membrane Fuel Cell (PEMFC) stack, improve the stack performance and reduce manufacturing cost.

Figure 1:
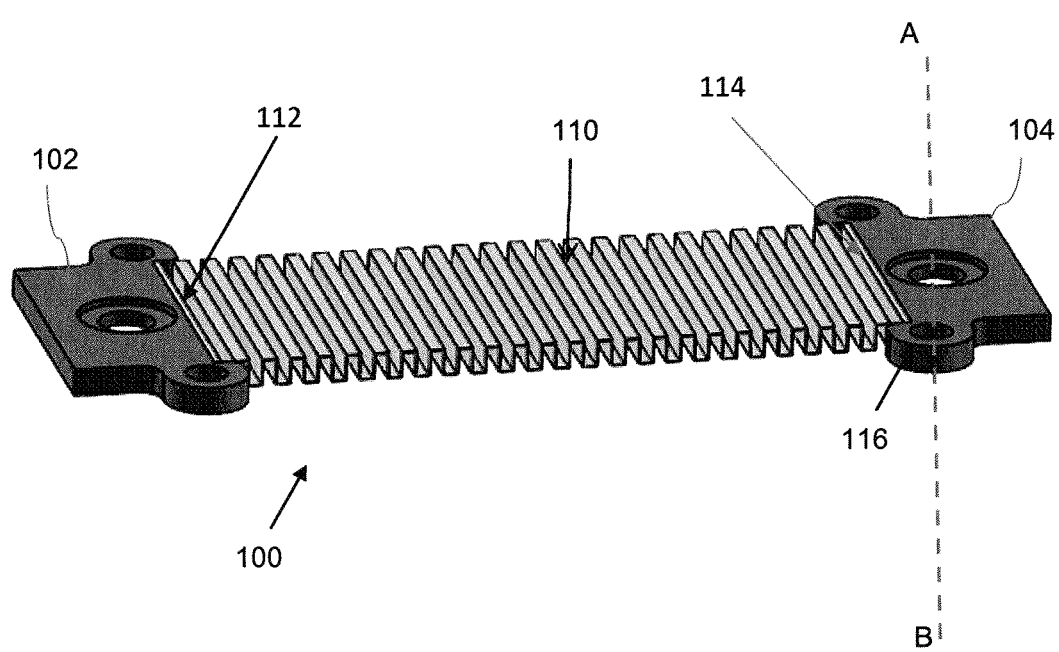
FIG. 1 is a front perspective view of a plate member for a cell stack in an exemplary embodiment.

FIG. 1 is a front perspective view of a plate member for a cell stack in an exemplary embodiment. In the exemplary embodiment, the plate member 100 comprises two alignment parts 102, 104 and a channel sheet 110. In the exemplary embodiment, the channel sheet 110 comprises at least one peak and one trough in the body of the sheet and is in the form of a corrugated sheet 110. The corrugated sheet 110 is coupled to the first alignment part 102 at a first end or edge 112 of the corrugated sheet 110 and to the second alignment part 104 at a second end or edge 114 of the corrugated sheet 110. Therefore, the corrugated sheet 110 is disposed between the first and second alignment parts 102, 104.

In the example embodiment, each alignment part comprises a main body and one or more alignment members e.g. 116. The main body is provided with a through hole within the main body.

In the example embodiment, the alignment part is able to align the corrugated sheet 110 parallel to a plane of the main body, and the alignment member e.g. 116 of the alignment part is able to align to another corresponding alignment member (not shown) along an axis AB passing through the alignment member. For example, the alignment member may align with an alignment member of another alignment part or an end plate stacked either on a top or a bottom surface of the alignment part.

Figure 2A:
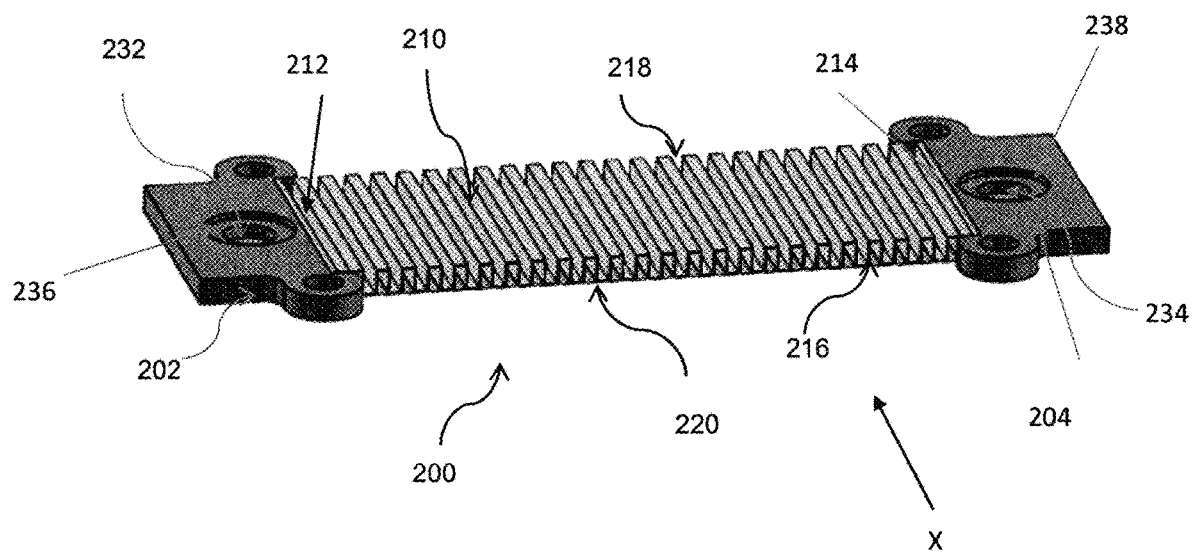
FIG. 2A is a front perspective view of a plate member with a separator sheet removably attached in another exemplary embodiment.
Figure 2B:
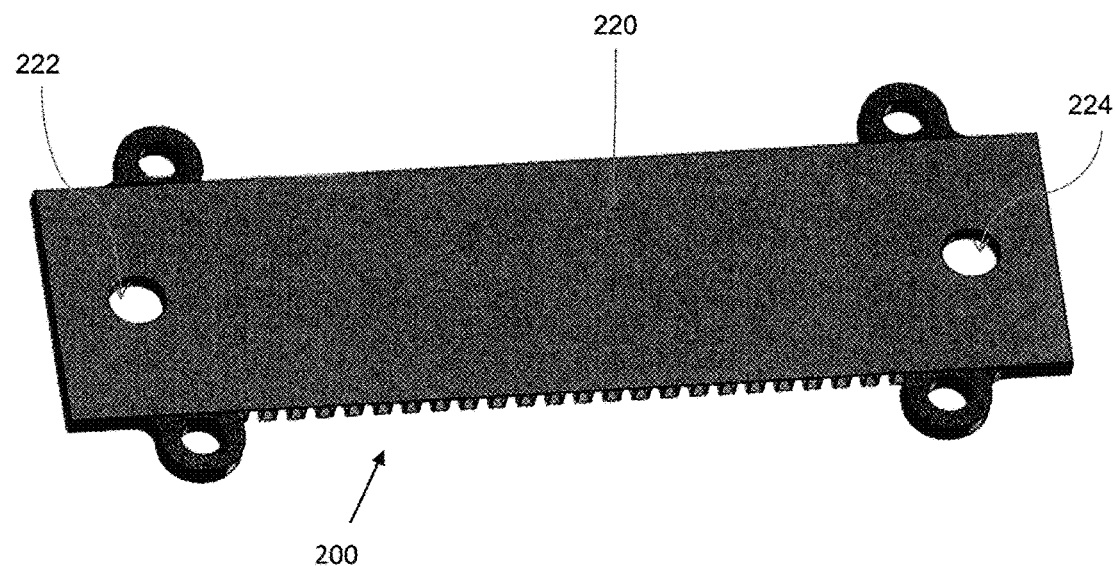
FIG. 2B is a bottom view of the plate member of FIG. 2A.
Figure 3:
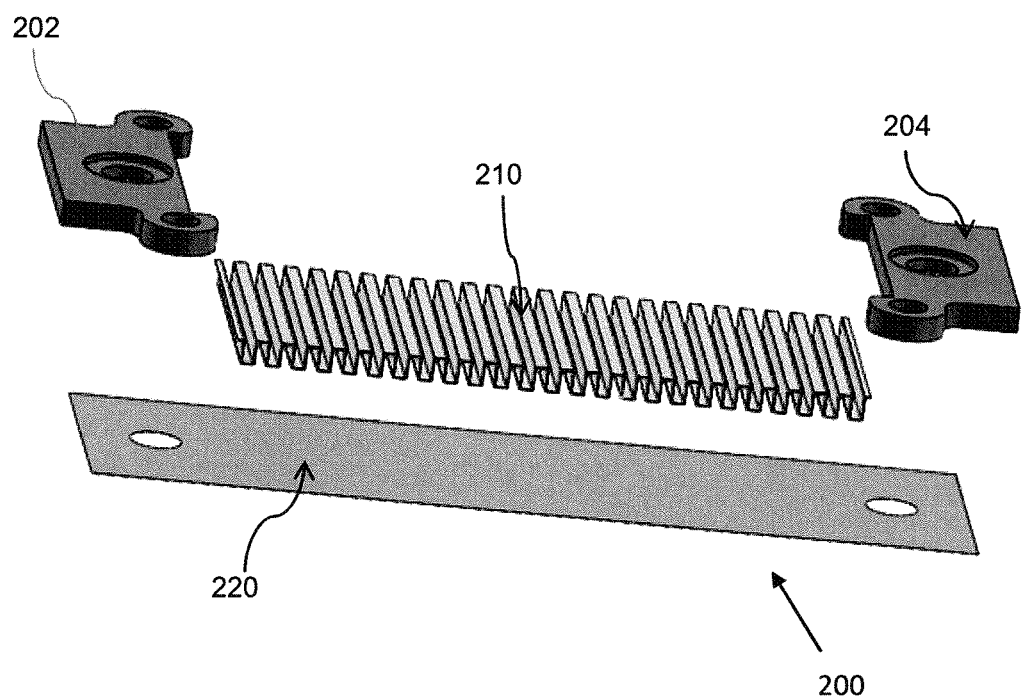
FIG. 3 is an exploded view of the plate member of FIGS. 2A and 2B.

FIG. 2A is a front perspective view of a plate member with a separator sheet removably attached in another exemplary embodiment. FIG. 2B is a bottom view of the plate member of FIG. 2A. FIG. 3 is an exploded view of the plate member 200 of FIGS. 2A and 2B. For the ease of illustration, like numerals from FIGS. 2A and 2B are used in FIG. 3.

In the exemplary embodiment, the plate member 200 is substantially similar to the plate member 100 of FIG. 1. The plate member 200 comprises a first and a second alignment part 202, 204 respectively, a corrugated sheet 210 and a separator sheet 220.

In the exemplary embodiment, the first and second alignment parts 202, 204, the corrugated sheet 210 and the separator sheet 220 are removably attached to one another.

Each alignment part 202, 204 comprises a through hole 232, 234 respectively. A groove or recess is provided around each through hole 232, 234 and are identified as respective sealing parts 236, 238. The separator sheet 220 comprises a pair of apertures 222, 224 symmetrically located at opposite ends of the separator sheet 220. The corrugated sheet 210 is engaged/coupled to the first and second alignment parts 202, 204 at a first end/edge 212 of the corrugated sheet 210 and at a second end/edge 214 of the corrugated sheet 210 respectively. The plate member 200 is formed by orientating the separator sheet 220 with respect to the alignment parts 202, 204 such that the through holes 232, 234 of the alignment parts 202, 204 are aligned to the corresponding apertures 222, 224 of the separator sheet 220.

In the exemplary embodiment, each sealing part 236, 238 is used to contain a complementary sealing component/materials. A complementary sealing component, for example a gasket, O ring, or any other suitable sealing material is disposed in the sealing part 236, 238 (e.g. grooves or recesses) to provide airtight integration. Therefore, after the first and second alignment parts 202, 204, the corrugated sheet 210 and the separator sheet 220 are coupled to one another, at the first alignment part 202, a through opening is formed by the aperture 222, the corresponding sealing component (e.g. gasket, O ring etc) and the through hole 232. At the second alignment part 204, another through opening is formed by the aperture 224, the corresponding sealing component and the through hole 234.

With the separator sheet 220 coupled in an airtight arrangement with the first and second alignment parts 202, 204, by co-operating with the corrugated sheet 210, fluid flow channels are formed. That is, a plurality of closed troughs e.g. 216 and open troughs e.g. 218 are formed and located in an interval manner. The closed troughs 216 are channels formed between the corrugated sheet 210 and the separator sheet 220, with openings at two ends (that is, closed through channels when viewed in the direction of X in FIG. 2A). The closed troughs 216 are capable of functioning as air flow channels for cooling the separator sheet 220, the corrugated sheet 210, and thus, an assembled cell stack after assembly. The open troughs 218 are open or not enclosed in the direction perpendicular to the plane of the corrugated sheet 210, or perpendicular to the plane or surface of the separator sheet 220. Therefore, the open troughs 218 are capable of dispersing air flowing through the open troughs 218 into the perpendicular direction. For example, air flowing through the open troughs 218 may be dispersed onto a diffusion medium on the cathode side of a MEA (which will be described later) subsequently attached on the surface of the corrugated sheet 210 that exposes the open troughs 218.

Figure 4A:
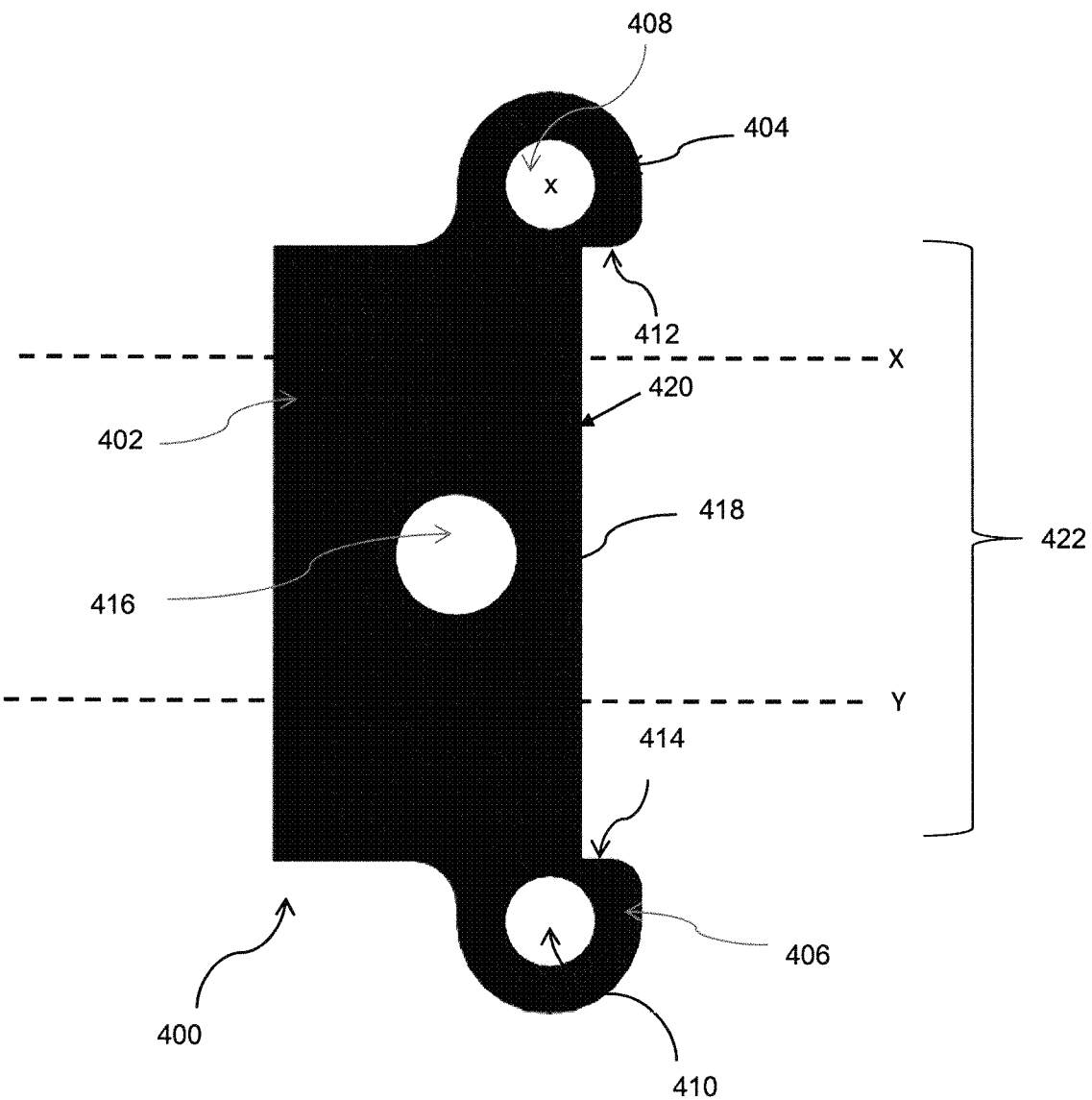
FIG. 4A is a top view of an alignment part in an exemplary embodiment.
Figure 4B:
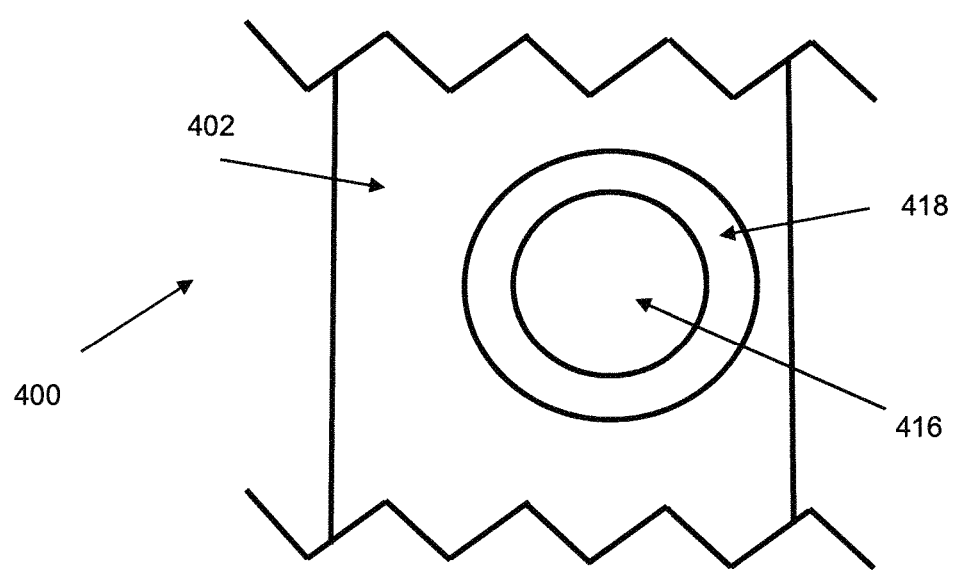
FIG. 4B is an enlarged view of the alignment part of FIG. 4A between the lines X and Y.

FIG. 4A is a top view of an alignment part in an exemplary embodiment. FIG. 4B is an enlarged view of the alignment part of FIG. 4A between the lines X and Y.

The alignment part 400 is substantially identical to the alignment parts 102, 104 of FIG. 1 and the alignment parts 202, 204 of FIGS. 2A to 3. In the exemplary embodiment, the alignment part 400 comprises a main body 402, the main body 402 being a substantially rectangular sheet, and one or more alignment members, each alignment member disposed at one end of the main body 402. In the exemplary embodiment, there are provided two alignment members that are in the shapes of a substantially circular ring. The two alignment members are provided as two alignment rings 404, 406 symmetrically located at opposite sides or ends of the main body 402. Each alignment ring 404, 406 comprises an alignment hole 408, 410 provided substantially in the centre of the ring 404, 406 and an alignment fringe 412, 414.

The alignment hole 408, 410 is able to align to another corresponding alignment member (not shown) along an axis passing through the alignment hole 408, 410. An example of the axis is shown passing through the alignment hole 408 into the plane of the paper ("x"). For example, the alignment hole may align with an alignment member of another alignment part (e.g. identical to alignment part 400) or an end plate stacked either on a top or a bottom surface of the alignment part 400.

In the exemplary embodiment, the alignment fringe 412, 414 is substantially straight and perpendicular to a longitudinal edge 420 of the main body 402. Each alignment fringe 412, 414 extends/projects from the longitudinal edge 420 of the main body 402, and extends within the plane of the main body. With this arrangement, the alignment fringes 412, 414 form a receiving dock 422 that provides an engagement surface to engage a channel sheet.

The alignment part 400 further comprises a through hole 416 provided within the main body 402. The through hole 416 is provided substantially in the centre of the main body 402. A sealing part 418 in the form of a groove or recess is provided around the through hole 416. It will be appreciated that another similar sealing part (not shown) may be provided around the through hole 416 on the opposite surface of the alignment part 400 or the flipside of the alignment part 400. In such an instance, therefore, respective sealing parts are provided on two opposing surfaces of the alignment part. The through hole 416 is capable of functioning as part of a reactant gas (for example, hydrogen) flow channel to be described in greater detail below with reference to FIG. 9G. The sealing part 418 is used to contain or receive a complementary sealing component, for example a gasket or O ring, during assembly for the purpose of airtight sealing.

The alignment part 400 may be produced by methods including, but not limited to, molding, casting, 3-D printing etc. The alignment part 400 may be made from materials including, but not limited to, metal, plastic (e.g. acrylonitrile butadiene styrene (ABS), Polylactic acid (PLA)) or composites etc.

Figure 5:
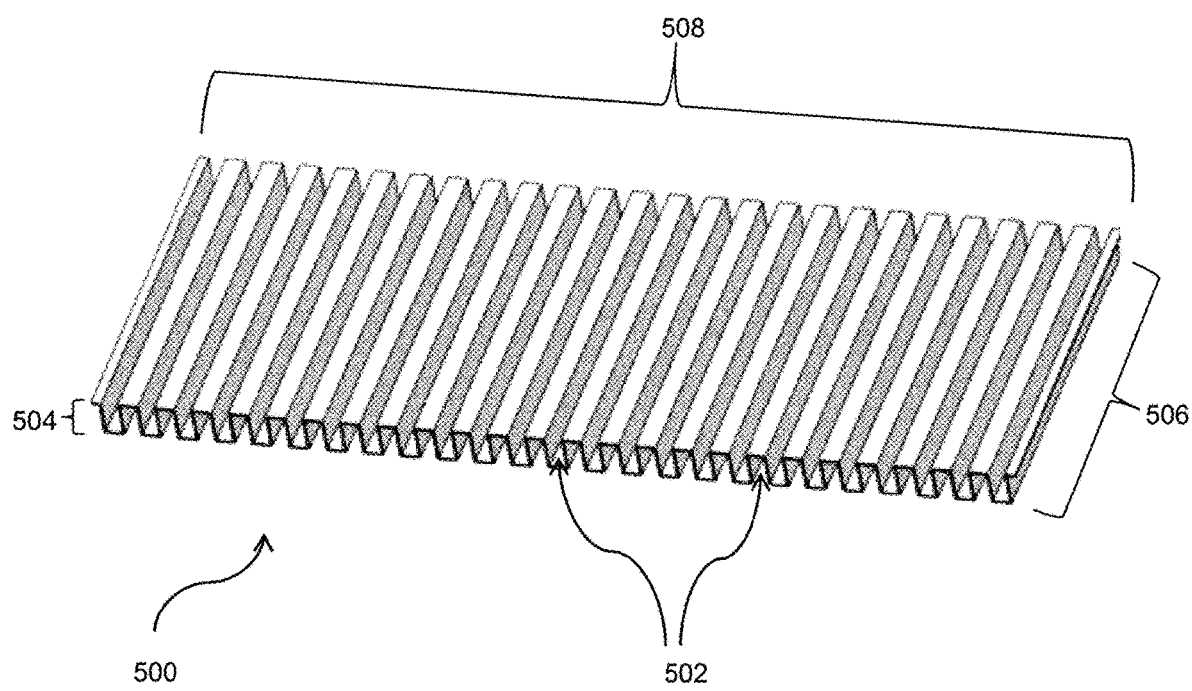
FIG. 5 is a front perspective view of a corrugated sheet in an exemplary embodiment.

FIG. 5 is a front perspective view of a corrugated sheet in an exemplary embodiment. The corrugated sheet 500 is substantially identical to the channel sheet 110 of FIG. 1 and the corrugated sheet 210 of FIGS. 2A to 3.

In the exemplary embodiment, a corrugated sheet 500 comprises a plurality of troughs 502 formed opening up and down in an interval manner. For example, a trough is formed between two peaks. The depth of each trough is substantially the same. The corrugated sheet 500 is formed by, but is not limited to, mechanically stamping or rolling from a metal foil. In the exemplary embodiment, the metal foil is of a thickness of, but is not limited to, about 0.05 mm to about 0.4 mm. The material of the foil may be, but is not limited to, stainless steel, aluminium or other alloys. The corrugated sheet 500 may be coated with a corrosion resistant layer, for example comprising, but is not limited to, a thin layer of gold, silver or electrically conductive polymers.

In an exemplary embodiment, the height of the corrugated sheet 500 is substantially the same or similar to the thickness of an alignment part e.g. 102, 104, 202, 204, 400 as described above.

In one exemplary embodiment for use in a portable fuel cell application, the sheet thickness used to form the corrugated sheet 500 is about 0.05 mm. In such an embodiment, the height 504 is about 1.1 mm. The width 506 is about 80.0 mm, and the length 508 is about 150.0 mm. It will be appreciated that the dimensions provided here are provided for exemplary purposes and may be varied substantially, depending on the application(s).

Figure 6:
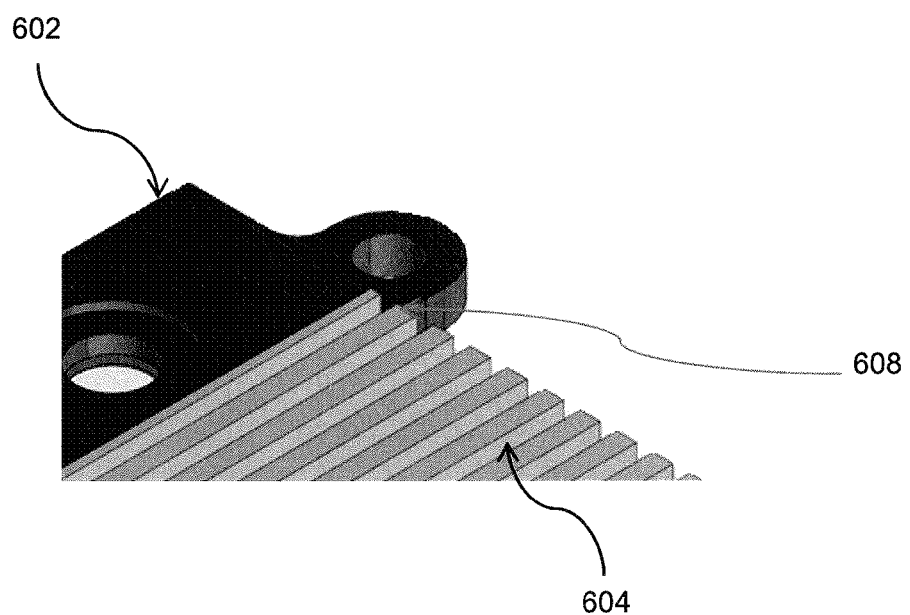
FIG. 6 is a partial enlarged drawing of a coupling between a corrugated sheet and an alignment part in an exemplary embodiment.

FIG. 6 is a partial enlarged drawing of a coupling between a corrugated sheet and an alignment part in an exemplary embodiment. The alignment part 602 is substantially identical to the alignment part 400 of FIG. 4A and the corrugated sheet 604 is substantially identical to the corrugated sheet 500 of FIG. 5.

Each end of the corrugated sheet 604 is attached to or abuts respectively an inner longitudinal edge of two alignment parts (compare the longitudinal edge 420 of the main body 402 of FIG. 4A). The longitudinal edge functions as the engagement surface to engage the corrugated sheet 604. In the exemplary embodiment, the corrugated sheet 604 is inserted between two alignment fringes of the alignment part 602. For illustration, only one alignment fringe 608 is shown in FIG. 6. The alignment fringes form a receiving dock (compare the receiving dock 422 of FIG. 4A). The distance provided between the pair of alignment fringes e.g. 608 of the alignment part 602 allows the corrugated sheet 604 to be held tightly between the pair of alignment fringes e.g. 608. In addition, the corrugated sheet 604 may also have a hook-type arrangement by additionally contacting the top surface of the alignment part at the longitudinal edge. Consequently, the corrugated sheet 604 is held tightly between the pair of alignment parts. The height of the corrugated sheet 604 is substantially the same or similar to the thickness of the alignment part 602. Therefore, the corrugated sheet 604 and the pair of alignment parts e.g. 602 are substantially flushed/level with one another in both the top and bottom surfaces of the alignment parts e.g. 602.

Figure 7:
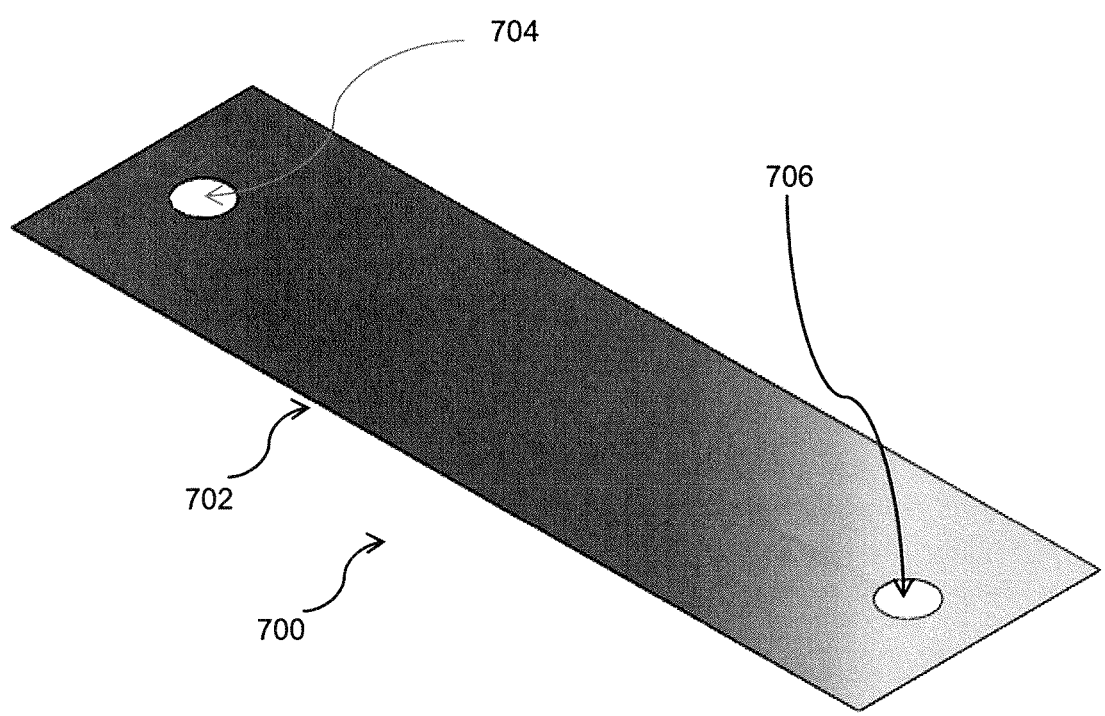
FIG. 7 is a top perspective view of a separator sheet in an exemplary embodiment.

FIG. 7 is a top perspective view of a separator sheet in an exemplary embodiment. The separator sheet 700 is substantially identical to the separator sheet 220 of FIGS. 2A, 2B and 3.

In the exemplary embodiment, the separator sheet 700 comprises a substantially rectangular sheet body 702. A pair of apertures 704, 706 are provided symmetrically located near the opposite ends of the sheet body 702. The positions of the apertures 704, 706 are predetermined such that the apertures 704, 706 correspond to through holes provided at two alignment parts. In the exemplary embodiment, the separator sheet 700 is made of, but is not limited to, an electrically conductive metal foil with a thickness of, but is not limited to, about 0.05 mm to 0.2 mm. Alternatively, the separator sheet 700 may be made of, but is not limited to, a graphite foil or similar material with a thickness of about 0.3 mm to 1 mm.

Figure 10:
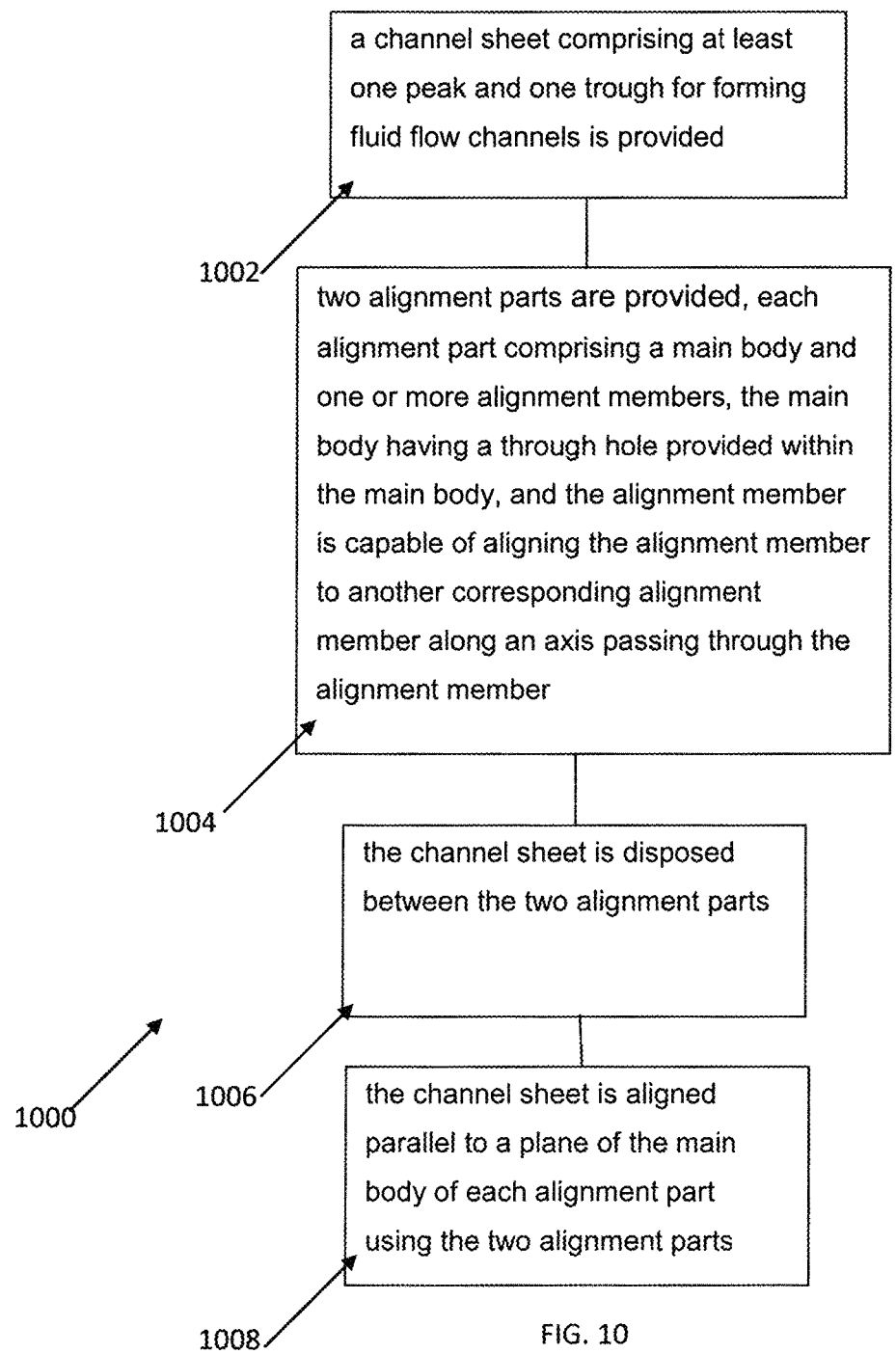
FIG. 10 is a schematic flowchart for illustrating a method of forming a plate member for a cell stack in an exemplary embodiment.

FIG. 10 is a schematic flowchart for illustrating a method of forming a plate member for a cell stack in an exemplary embodiment. At step 1002, a channel sheet comprising at least one peak and one trough for forming fluid flow channels is provided. At step 1004, two alignment parts are provided, each alignment part comprising a main body and one or more alignment members, the main body having a through hole provided within the main body, and the alignment member is capable of aligning the alignment member to another corresponding alignment member along an axis passing through the alignment member. At step 1006, the channel sheet is disposed between the two alignment parts. At step 1008, the channel sheet is aligned parallel to a plane of the main body of each alignment part using the two alignment parts.

In the description below, formation of a cell stack is described. A plate member substantially similar to the plate member 200 of FIGS. 2A, 2B and 3 is used as a bipolar plate of the cell stack.

Figure 8A:
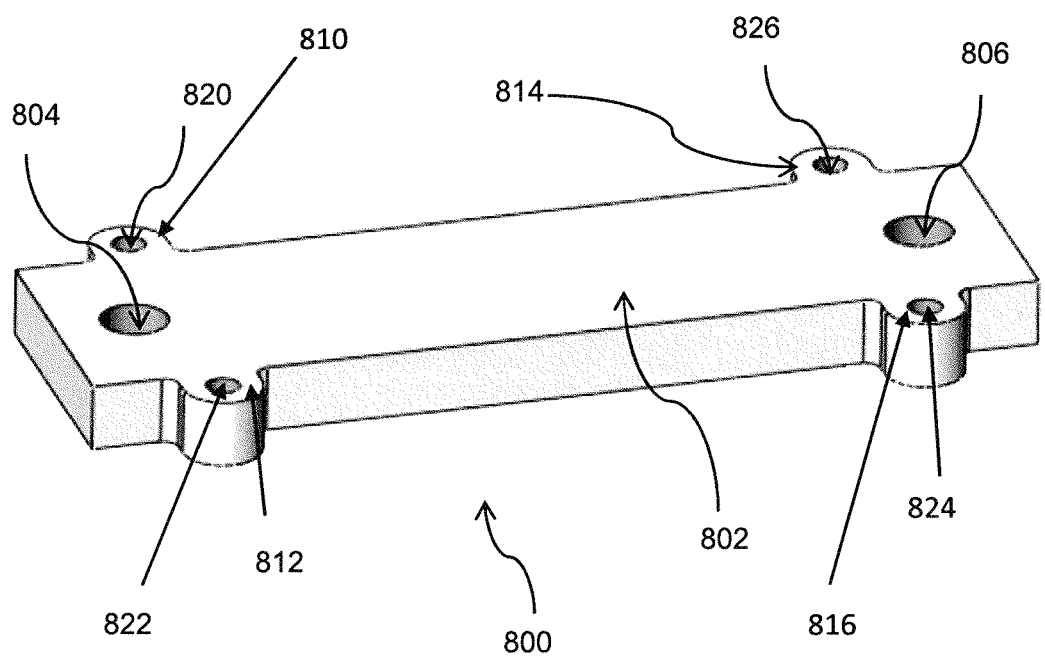
FIG. 8A is a front perspective view of an end plate.

FIG. 8A is a front perspective view of an end plate. The end plate 800 comprises a substantially rectangular main body 802, a pair of ducting holes 804, 806, two pairs of assembly rings 810, 812, 814, 816, and two pairs of corresponding assembly holes 820, 822, 824, 826. The end plate 800 functions as a base for a cell stack. The end plate 800 is used for, but is not limited to, holding a stack of plate members securely, for forming the shape of the stack, for fixing accessory parts etc. The ducting holes 804, 806 form part of the fuel gas (e.g. hydrogen) flow channels. The material of the end plate 800 may be, but is not limited to, metal, plastic, and composites.

Figure 8B:
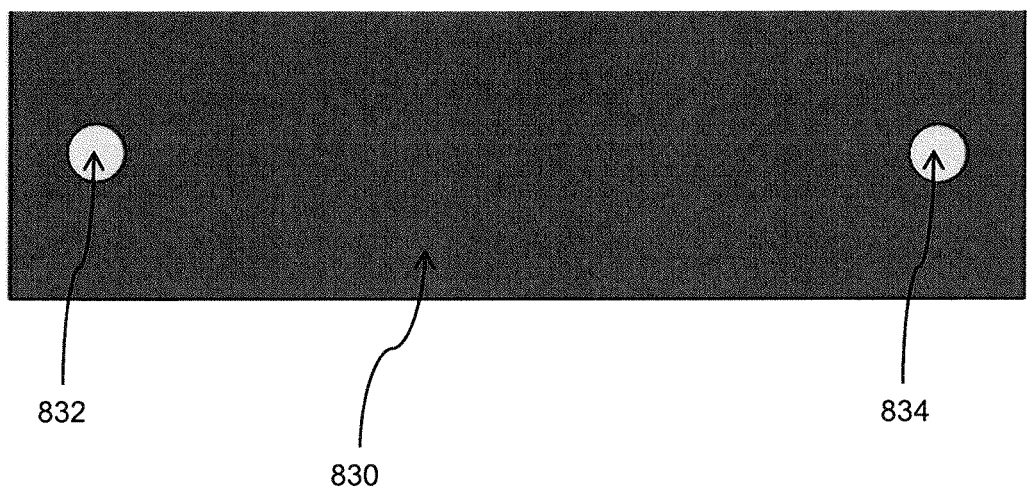
FIG. 8B is a front view of a Membrane Electrode Assembly (MEA).

FIG. 8B is a front view of a Membrane Electrode Assembly (MEA). The MEA 830 is a substantially rectangular body with two through apertures 832, 834 in opposite ends of the rectangular body. The MEA may be a commercially available MEA and in such cases, the detailed structure of the MEA 830 may be obtained from the manufacturer, such as Gore, Ballard, Johnson Matthey, and Yangtze etc. Typically, there is one layer of Proton Exchange Membrane (PEM) sandwiched between two layers of dispersion mediums. One catalyst layer is located in each of the interfaces between the PEM and the dispersion mediums. Thus, there are five layers of material in a typical MEA. Typically, according to the catalyst used, one side of the MEA is the cathode side where air can be introduced for reaction, and the other side is the anode side for input of hydrogen fuel.

FIGS. 9A to 9G are schematic drawings for illustrating the steps of assembling a fuel cell stack assembly in an exemplary embodiment.

Figure 9:
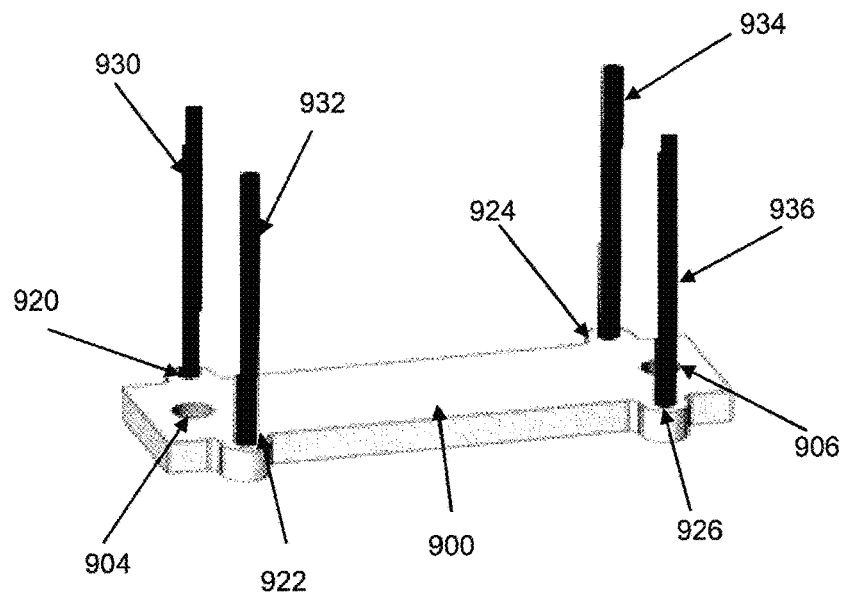
FIGS. 9A to 9G are schematic drawings for illustrating the steps of assembling a fuel cell stack assembly in an exemplary embodiment.
Figure 9:
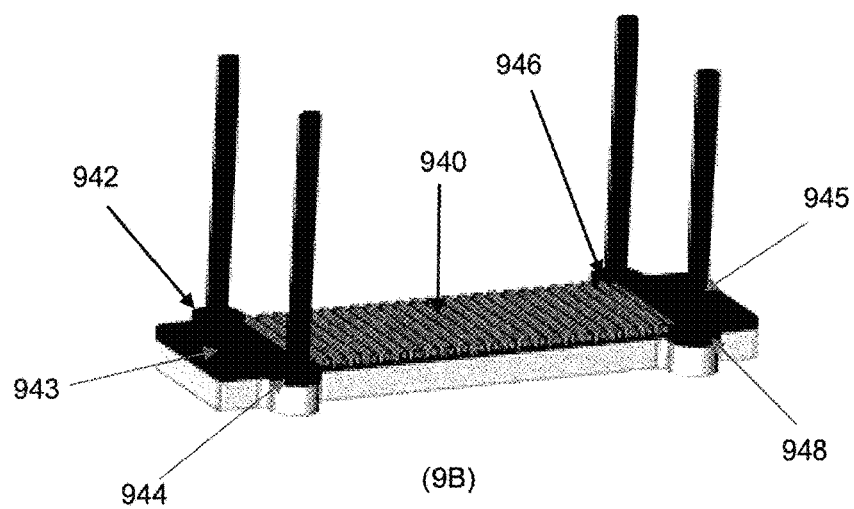
Figure 9:
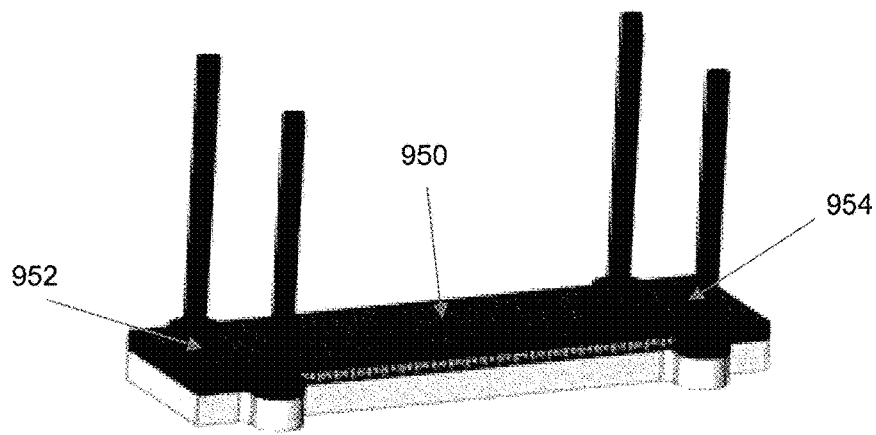
Figure 9:
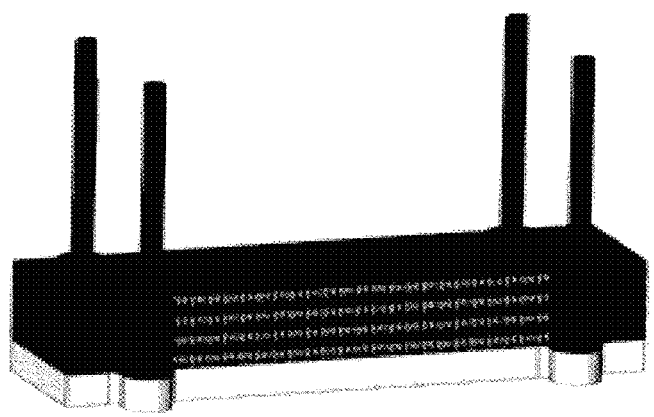
Figure 9:
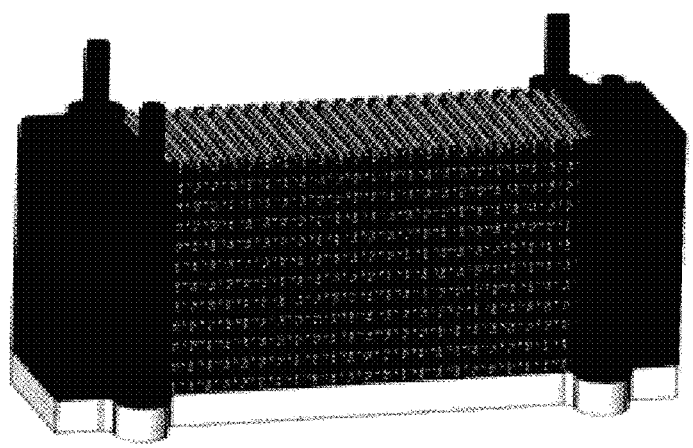
Figure 9:
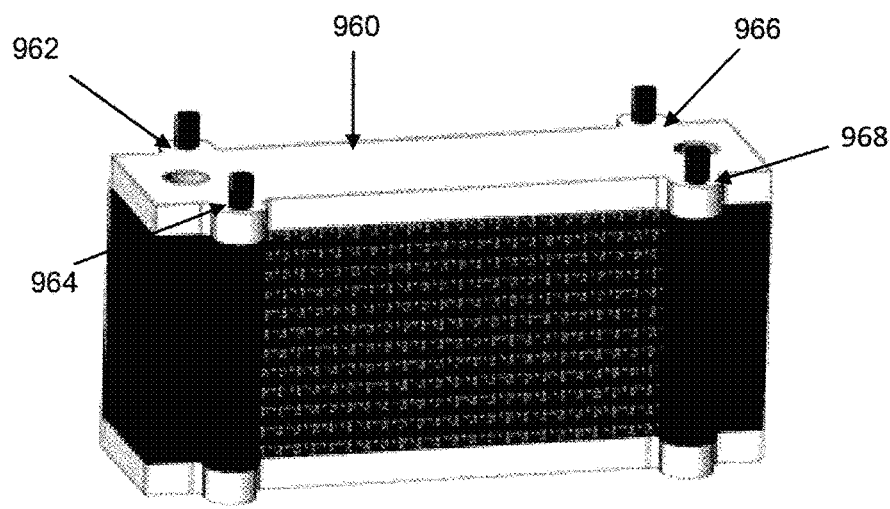
Figure 9:
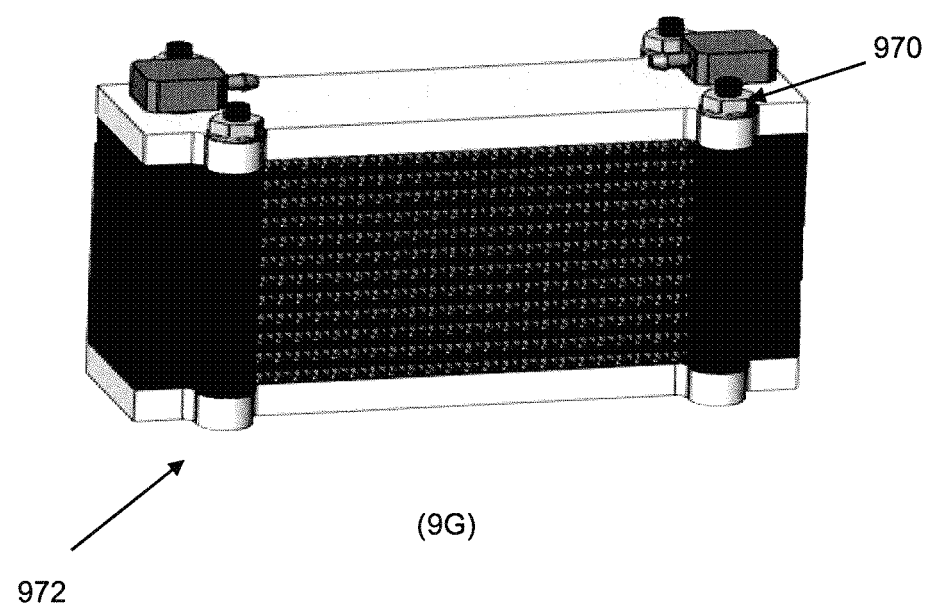

In FIG. 9A, a rod 930, 932, 934, 936 is installed/inserted into each assembly hole 920, 922, 924, 926 of a first end plate 900. The end plate 900 is substantially identical to the end plate 800 of FIG. 8A.

In FIG. 9B, a plate member 940 (e.g. 200 of FIGS. 2A and 2B) is assembled. The rods 930, 932, 934, 936 pass through alignment holes 942, 944, 946, 948 of the plate member 940. The separator sheet (not shown) of the plate member 940 rests on the first end plate 900. A plurality of open troughs (e.g. 218 of FIG. 2A) face upwards with respect to the end plate 900. In FIG. 9C, a layer of MEA 950 is located/placed on the top of the plate member 940, with the cathode side of the MEA 950 facing downwards, towards the open troughs. The MEA 950 thus abuts a top surface of the alignment part of the plate member 940. The MEA 950 is substantially identical to the MEA 830 of FIG. 8B. Each of the through apertures 952, 954 of the MEA 950 is aligned with a respective through opening formed by the apertures (e.g. 704, 706 of FIG. 7), the sealing components (e.g. gasket, O ring etc) of the plate member 940 and the through hole 943, 945 of the alignment parts of the plate member 940.

The MEA 950 and the plate member 940 form a single cell. More single cells are formed by repeating the above steps, until a pre-determined capacity or number of single cells is reached, as shown in FIGS. 9D and 9E.

In FIG. 9F, after a pre-determined capacity is reached, a second end plate 960 is located/placed. Each assembly hole 962, 964, 966, 968 of the second end plate 960 is installed/inserted with the respective rods 930, 932, 934, 936. Therefore, the cells are disposed between two end plates 900, 960.

In FIG. 9G, assembly of the fuel cell stack is completed by tightening nuts e.g. 970 on the rods 930, 932, 934, 936 and installing gas connectors (not shown) into the ducting holes 904, 906 of the first end plate 900.

After the other accessories, such as, current collectors, wires, fans etc. are installed, the assembled cell stack 972 is capable of being used as a power generator.

With the assembly of the cell stack 972, the respective aperture (e.g. 704, 706 of FIG. 7) of the separator sheet, the through hole 943 of the member plate, the through aperture 952 of the MEA and the ducting hole 904 are aligned and form a first fluid flow channel in one end of the stack. Similarly, at the other end of the stack, the other respective aperture of the separator sheet, the through hole 945 of the member plate, the through aperture 954 of the MEA and the ducting hole 906 are also aligned and form a second fluid flow channel.

In the exemplary embodiment, the cell stack 972 forms an open cathode assembly with the un-enclosed through channels of each corrugated sheet (compare channels viewed from arrow X of FIG. 2A). The troughs of each corrugated sheet form airflow channels for such an assembly.

In use, fuel (e.g. hydrogen gas) supplied from the gas connectors is delivered into the assembled cell stack 972 through the fluid flow channels. The fuel thus flows into the dispersion mediums in the anode sides of the MEAs e.g. 950. For the oxidant (oxygen) supply, air is inducted to the dispersion mediums in the cathode sides of the MEAs e.g. 950 through the plurality of open troughs (e.g. 218 of FIG. 2A). Electricity is thus generated from electrochemical reactions between the hydrogen and oxygen inside the MEAs e.g. 950.

During stack assembly, a large compressive force is used to minimize undesired contact resistance. It is recognised that a MEA is typically fragile. Therefore, if excessive force is used during the assembly process, this may crush or partially block the inlet and outlet of the flow channels in the MEA. This, in turn, affects the hydrogen flow rate into the cell and may compromise or even damage the fuel cell.

The plate member of the described exemplary embodiments may avoid the above problem. The alignment parts of the plate member are able to withstand compressive force, thereby protecting both the inlet and outlet of the flow channels from being blocked. As a result, the assembled fuel cell may eliminate a risk of blocked flow channels.

In the exemplary embodiment, the apertures of the various parts of a fuel cell e.g. the plate member, the MEA, the corrugated sheet and the separator sheet are well aligned. The aligned apertures form a continuous cylindrical shaped cavity within the fuel cell and act as an internal manifold/channel. Hydrogen gas may pass through this channel and is distributed evenly to the respective cells. For example only, this channel may be observed as the first fluid flow channel in one end of the stack of the cell stack 972. Excess hydrogen, when purged from the cells, exits through another similar manifold. It will be appreciated that other impurities within the fuel cell may also be purged via this manifold. For example only, this manifold/channel may be observed as the second fluid flow channel at another end of the stack of the cell stack 972. Due to the use of alignment parts, the exemplary embodiments may solve the problems arising from poor alignment in the fuel cell stack assembly. Poor alignment of the apertures within the fuel cell (bipolar plate, MEA, corrugated and separator sheet etc.) typically results in flow impediment of hydrogen gas. This lowers the performance of the stack due to reduced fuel intake. Poor alignment can also cause non-uniform distribution of hydrogen gas to each of the cells in the stack. This also results in lower overall performance due to a reduced stoichiometric number for cells with lower hydrogen intake.

The assembly process is simplified when the plate member of the exemplary embodiments are used. The alignment of the single cells is ensured since the rods (from an end plate) pass through the respective alignment holes (of alignment rings) of the plate members. By using the plate member of the described exemplary embodiments, good/accurate alignment of the fuel flow channels and the active areas of all the cells may be achieved. This benefits stack performance and increases aesthetic appeal of the cell stack.

In addition, by using two alignment parts in described exemplary embodiments, the length of the corrugated sheet may be reduced, when compared to the prevailing method in which the length of the corrugated sheet is typically the same as the length of a stack. The corrugated sheets may be coated with precious metals for corrosion resistance and are thus, relatively expensive. The cost of the stack may be reduced by replacing part of the corrugated sheet with less expensive material e.g. the alignment parts. Further, the sealing around the gas flow channels is also simplified and significantly enhanced since room/space is provided for the sealing components/materials.

The exemplary embodiments described herein may provide open cathode assemblies. There have been applications for closed cathode assemblies. Closed cathode assemblies are provided with oxidant flow channels and an external oxidant supply system. In comparison, open cathode assemblies operate in ambient air and are desirably less costly and less complex to manufacture than closed cathode assemblies. Open cathode assemblies also consume less parasitic power than closed cathode assemblies.

In other exemplary embodiments, the plate member may be integrated/assembled with a MEA before assembly into a cell stack.

Thus, in view of the above, the described exemplary embodiments may provide an integrated bipolar plate, which combines a corrugated sheet and a separator sheet, and that in turn provides alignment guidance or measures for sealing and alignment of multiple bipolar plates.

In the described exemplary embodiments, the corrugated sheet is described as rectangular in shape. However, it will be appreciated that the exemplary embodiments are not limited as such. For example, the corrugated sheet may be of any suitable shapes, such as circular in shape etc.

In the described exemplary embodiments, the cell stack is described primarily as a fuel cell stack. However, it will be appreciated that the exemplary embodiments are not limited as such and the exemplary embodiments may extend to providing plate members for a cell stack for other suitable purposes.

In the described exemplary embodiments, the plate member may be used as a bipolar plate. However, it will be appreciated that the exemplary embodiments are not limited as such and the exemplary embodiments may extend to providing plate members for other suitable purposes.

In the described exemplary embodiments, the alignment member is described as an aperture. However, it will be appreciated that the exemplary embodiments are not limited as such and the alignment member may be, but is not limited to, a hole-projection arrangement such as having a projection projecting from the bottom surface of the alignment part to mate with a hole provided on the top surface of another alignment part stacked at the bottom surface of the alignment part.

The terms "coupled" or "connected" as used in this description are intended to cover both directly connected or connected through one or more intermediate means, unless otherwise stated.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. The intention of the above specific disclosure is applicable to any depth/breadth of a range.

Further, the term 'hole' as used in the description herein may refer to an aperture, and such terms may be used interchangeably in the description.

It will be appreciated by a person skilled in the art that other variations and/or modifications may be made to the specific embodiments without departing from the scope of the invention as broadly described. The present embodiments are, therefore, to be considered in all respects to be illustrative and not restrictive.

The invention claimed is:

1. A plate member for an open cathode fuel cell stack, the plate member comprising:
   a corrugated channel sheet having opposing first and second end edges along a first direction and opposing first and second side edges along a second direction, wherein the corrugated channel sheet includes peaks and troughs that form parallel flow channels along the first direction, the flow channels include opposing first and second channel end openings at the first and second opposing side edges of the corrugated channel sheet, wherein the flow channels provide ambient air for fuel cell reaction as well as for cooling the fuel cell stack;
   a first alignment part disposed at the first end edge of the corrugated channel sheet and a second alignment part disposed at the second end edge of the corrugated channel sheet, wherein
      the first alignment part includes a first alignment body with one or more first alignment holes and a first through hole, the first through hole serves as a part of a reactant gas flow channel for fuel of the fuel cell, the first through hole is distinct from the one or more first alignment holes, and
      the second alignment part includes a second alignment body with one or more second alignment holes and a second through hole, the second through hole serves as a part of the reactant gas flow channel, the second through hole is distinct from the one or more second alignment holes;
   wherein the one or more first and second alignment holes of the first and second alignment parts facilitate horizontal and vertical alignment of the corrugated channel sheet with at least one other corrugated channel sheet with first and second alignment parts to create stacked corrugated channel sheets to form the fuel cell stack, wherein
horizontal and vertical alignment is facilitated by using alignment rods which extend perpendicularly through the one or more first alignment holes and the one or more second alignment holes of the first and second alignment parts of the stacked corrugated channel sheets,
the first through holes of the first alignment parts of the stacked corrugated channel sheets are aligned, and
the second through holes of the second alignment parts of the stacked corrugated channel sheets are aligned;
wherein the first alignment part further includes a first engagement surface configured to mate with the first end edge of the corrugated channel sheet and the second alignment part further includes a second engagement surface configured to mate with the second end edge of the corrugated channel sheet, wherein the first and second engagement surfaces facilitate horizontal alignment of the corrugated channel sheet parallel to a plane of the first alignment body and the second alignment body; and
wherein:
the first alignment body includes
a first main body portion with a first end engagement surface of the first engagement surface which engages the first end edge of the corrugated channel sheet, and
first wing body portions on opposing first and second sides of the first main body portion, the first wing body portions form opposing first side engagement surfaces of the first engagement surface which engage first and second opposing sides of the corrugated channel sheet at and near the first end edge, and
the second alignment body includes
a second main body portion with a second end engagement surface of the second engagement surface which engages the second end edge of the corrugated channel sheet, and
second wing body portions on opposing first and second sides of the second main body portion, the second wing body portions form opposing second side engagement surfaces of the second engagement surface which engage first and second opposing sides of the corrugated channel sheet at and near the second end edge.

2. The plate member as claimed in claim 1, wherein the first through hole is disposed in the first main body portion of the first alignment body and the second through hole is disposed in the second main body portion of the second alignment body.

3. The plate member as claimed in claim 1, wherein:
the one or more first alignment holes are located in the first wing body portions; and
the one or more second alignment holes are located in the second wing body portions.

4. The plate member as claimed in claim 1, wherein the first and second through holes each further comprises respective sealing parts provided on two opposing surfaces of the first and second through holes, wherein each of the sealing parts contains a sealing component.

5. The plate member as claimed in claim 1, further comprising a separator sheet disposed under the corrugated channel sheet, the separator sheet extends beyond the first and second end edges of the corrugated channel sheet and abuts bottom surfaces of the first and second alignment parts, the separator sheet having first and second separator sheet through holes which are aligned to the first and second through holes of the first and second alignment parts.

6. The plate member as claimed in claim 5, wherein the corrugated channel sheet and the separator sheet co-operate to form the flow channels, wherein
the ambient air for cooling the fuel cell stack is provided to the flow channels formed by the corrugated channel sheet and the separator; and
the ambient air for fuel cell reaction is provided to the flow channels formed by the corrugated channel sheet and a membrane electrode assembly (MEA).

7. The plate member as claimed in claim 1, wherein the corrugated channel sheet is in a form of a rectangular corrugated sheet.

8. The plate member as claimed in claim 1, further comprising a membrane electrode assembly (MEA) disposed over the corrugated channel sheet, the MEA extends beyond the first and second end edges of the corrugated channel sheet and abuts top surfaces of the first and second alignment parts such that the ambient air flow within the flow channels is dispersible onto the MEA.

9. The plate member as claimed in claim 1, wherein the plate member is a member of the fuel cell stack, wherein the fuel cell stack comprises:
a bottom end plate, the bottom end plate comprising bottom end plate alignment holes;
a top end plate, the top end plate comprising top end plate alignment holes;
a plurality of plate members, each with first and second alignment parts at first and second end edges of the corrugated channel sheet, disposed between the bottom end and top end plates; and
wherein the one or more first alignment holes and the one or more second alignment holes of the plurality of plate members are aligned to the top end plate and bottom end plate alignment holes of the bottom end plate and the top end plate to facilitate the horizontal and vertical alignment of the fuel cell stack.

10. The plate member as claimed in claim 9, wherein the fuel cell stack comprises alignment rods which extend perpendicularly through the top end plate alignment holes of the top end plate, the one or more first alignment holes and the one or more second alignment holes of the first and second alignment parts of the plurality of plate members, and the bottom end plate alignment holes.

11. A plate member for a fuel cell stack, the plate member comprising:
a corrugated channel sheet having opposing first and second end edges along a first direction and opposing first and second side edges along a second direction, wherein the corrugated channel sheet includes peaks and troughs that form parallel flow channels along the first direction, the flow channels include opposing first and second channel end openings at the first and second opposing side edges of the corrugated channel sheet, wherein the flow channels provide ambient air for fuel cell reaction as well as for cooling the fuel cell stack;
first and second alignment parts, wherein the first alignment part is disposed at the first end edge of the corrugated channel sheet and the second alignment part is disposed at the second end edge of the corrugated channel sheet, wherein
the first alignment part includes a first alignment body with one or more first alignment holes and a first through hole, the first through hole serves as a part of a reactant gas flow channel for fuel of the fuel cell, the first through hole is distinct from the one or more first alignment holes, and the second alignment part includes a second alignment body with one or more second alignment holes and a second through hole, the second through hole serves as a part of the reactant gas flow channel, the second through hole is distinct from the one or more second alignment holes;

wherein the one or more first and second alignment holes of the first and second alignment parts facilitate horizontal and vertical alignment of the corrugated channel sheet with at least one other corrugated channel sheet with first and second alignment parts to create stacked corrugated channel sheets to form the fuel cell stack, wherein horizontal and vertical alignment is facilitated by using alignment rods which extend perpendicularly through the one or more first and second alignment holes of the first and second alignment parts of the stacked corrugated channel sheets, the first through holes of the first alignment parts of the stacked corrugated channel sheets are aligned, and the second through holes of the second alignment parts of the stacked corrugated channel sheets are aligned;

wherein the first through hole is disposed in a first main body portion of the first alignment body and the second through hole is disposed in a second main body portion of the second alignment body;

wherein a first engagement surface of the first alignment part is configured to mate with the first end edge of the corrugated channel sheet and a second engagement surface of the second alignment part is configured to mate with the second end edge of the corrugated channel sheet, wherein the first and second engagement surfaces facilitate horizontal alignment of the corrugated channel sheet parallel to a plane of the first alignment body and the second alignment body; and wherein:

the first alignment body includes the first main body portion with a first end engagement surface of the first engagement surface which engages the first end edge of the corrugated channel sheet, and first wing body portions on opposing first and second sides of the first main body portion, the first wing body portions form opposing first side engagement surfaces of the first engagement surface which engage first and second opposing sides of the corrugated channel sheet at and near the first end edge, and the second alignment body includes the second main body portion with a second end engagement surface of the second engagement surface which engages the second end edge of the corrugated channel sheet, and second wing body portions on opposing first and second sides of the second main body portion, the second wing body portions form opposing second side engagement surfaces of the second engagement surface which engage first and second opposing sides of the corrugated channel sheet at and near the second end edge.

12. The plate member as claimed in claim 11, wherein each of the first and second through holes further comprises respective sealing parts provided on two opposing surfaces of the first and second through holes.

13. The plate member as claimed in claim 12, wherein each of the sealing parts is configured to be capable of containing a sealing component.

14. The plate member as claimed in claim 11, further comprises a separator sheet disposed under the corrugated channel sheet, the separator sheet extends beyond the first and second end edges of the corrugated channel sheet and abuts surfaces of the first and second alignment parts, the separator sheet having first and second through holes which are aligned to the first and second through holes of the first and second alignment parts.

15. The plate member as claimed in claim 14, wherein the flow channels are in connection with the corrugated channel sheet and the separator sheet, wherein the ambient air for cooling the fuel cell stack is provided to the flow channels formed by the corrugated channel sheet and the separator sheet; and the ambient air for fuel cell reaction is provided to the flow channels formed by the corrugated channel sheet and a membrane electrode assembly (MEA).

16. The plate member as claimed in claim 11, wherein the corrugated channel sheet is in a form of a rectangular corrugated sheet.

17. The plate member as claimed in claim 11, further comprises a membrane electrode assembly (MEA) disposed over the corrugated channel sheet, the MEA extends beyond the first and second end edges of the corrugated channel sheet and abuts top surfaces of the first and second alignment parts such that the ambient air flow within the flow channels is dispersible onto the MEA.

18. The plate member as claimed in claim 11, wherein the plate member is a member of the fuel cell stack, wherein the fuel cell stack comprises:

a bottom end plate, the bottom end plate comprising bottom end plate alignment holes;

a top end plate, the top end plate comprising top end plate alignment holes;

a plurality of plate members, each with first and second alignment parts at first and second end edges of the corrugated channel sheet, disposed between the bottom end and top end plates; and wherein the one or more first alignment holes and the one or more second alignment holes of the plurality of plate members are aligned to the top end plate and bottom end plate alignment holes of the bottom end plate and the top end plate to facilitate the horizontal and vertical alignment of the fuel cell stack.

* * * * *